US011189908B2

(12) United States Patent
Fleischer et al.

(10) Patent No.: US 11,189,908 B2
(45) Date of Patent: Nov. 30, 2021

(54) DIRECTIONAL WIRELESS HOTSPOT DEVICE AND METHOD FOR POINTING A DIRECTIONAL ANTENNA

(71) Applicant: MiWire ApS, Hellebæk (DK)

(72) Inventors: David Fleischer, Hellebæk (DK); Michael Jørgsholm, Helsingør (DK)

(73) Assignee: MiWire ApS, Hellebæk (DK)

( * ) Notice: Subject to any disclaimer, the term of this patent is extended or adjusted under 35 U.S.C. 154(b) by 40 days.

(21) Appl. No.: 16/311,319

(22) PCT Filed: Jun. 20, 2017

(86) PCT No.: PCT/EP2017/065043
§ 371 (c)(1),
(2) Date: Dec. 19, 2018

(87) PCT Pub. No.: WO2017/220549
PCT Pub. Date: Dec. 28, 2017

(65) Prior Publication Data
US 2019/0237850 A1    Aug. 1, 2019

(30) Foreign Application Priority Data

Jun. 21, 2016  (DK) ............................ PA 2016 70445
Nov. 30, 2016  (DK) ............................ PA 2016 70949

(51) Int. Cl.
*H01Q 1/22*     (2006.01)
*H01Q 1/12*     (2006.01)
(Continued)

(52) U.S. Cl.
CPC ........... *H01Q 1/2291* (2013.01); *H01Q 1/125* (2013.01); *H01Q 1/42* (2013.01); *H01Q 3/02* (2013.01);
(Continued)

(58) Field of Classification Search
CPC ..... H04W 88/08; H01Q 1/125; H01Q 1/2291; H01Q 3/02; H01Q 3/04
See application file for complete search history.

(56) References Cited

U.S. PATENT DOCUMENTS 5,519,408 A * 5/1996 Schnetzer ............ H01Q 13/085
                                                343/767
6,016,120 A * 1/2000 McNabb ............... H01Q 1/1257
                                                342/357.36
(Continued)

FOREIGN PATENT DOCUMENTS

JP        H11186828 A    7/1999
KR     20060091482 A    8/2006

OTHER PUBLICATIONS

Anonymous: "MiFi—Wikipedia, the free encyclopedia"; Retrieved from the Internet: URL: https://en.wikipedia.org/w/index.php?title=MiFi&oldid=647385095; Jun. 5, 2016.

*Primary Examiner* — Daniel Munoz
(74) *Attorney, Agent, or Firm* — Dinsmore & Shohl LLP

(57) ABSTRACT

A directional wireless hotspot device for communication in a mobile network has a number of distributed cells, each cell covered by at least one fixed transceiver. The device includes: a printed circuit board; a directional antenna; a compass, such as a magnetometer; a geographical positioning device, such as a GPS receiver; an electric motor, such as a substantially flat piezoelectric motor, for rotating the printed circuit board around an axis substantially perpendicular to the directional antenna; a wireless modem, such as a 3G/4G/LTE/5G modem, or a receiving element, such as a socket, arranged to receive an external wireless modem; a local communication element, such as a Wi-Fi circuit, for communication with a local device; a microprocessor configured to calculate an azimuthal rotation angle for pointing the directional antenna to one of the fixed transceivers based (Continued)

on: directional and positional data from the compass and geographical positioning device; positional data of the fixed transceivers; a housing.

14 Claims, 10 Drawing Sheets

(51) Int. Cl.
| | |
|---|---|
| *H04W 88/04* | (2009.01) |
| *H01Q 1/42* | (2006.01) |
| *H01Q 3/04* | (2006.01) |
| *H01Q 13/08* | (2006.01) |
| *H01Q 3/02* | (2006.01) |
| *H04W 84/12* | (2009.01) |
| *H01Q 21/28* | (2006.01) |
| *H01Q 5/40* | (2015.01) |

(52) U.S. Cl.
CPC ............. *H01Q 3/04* (2013.01); *H01Q 13/085* (2013.01); *H04W 84/12* (2013.01); *H04W 88/04* (2013.01); *H01Q 5/40* (2015.01); *H01Q 21/28* (2013.01)

(56) References Cited

U.S. PATENT DOCUMENTS

| | | | |
|---|---|---|---|
| 8,836,597 | B1 | 9/2014 | Vizzio et al. |
| 9,337,536 | B1 | 5/2016 | Paulsen et al. |
| 2006/0181471 | A1 | 8/2006 | Kim et al. |
| 2010/0259458 | A1 | 10/2010 | Mattis et al. |
| 2013/0321225 | A1 | 12/2013 | Pettus |
| 2015/0155904 | A1* | 6/2015 | Ingalls ................ H04B 1/40 455/562.1 |
| 2015/0215954 | A1 | 7/2015 | Pal et al. |

* cited by examiner

DIRECTIONAL WIRELESS HOTSPOT DEVICE AND METHOD FOR POINTING A DIRECTIONAL ANTENNA

CROSS-REFERENCE TO RELATED APPLICATIONS

This application is the U.S. national stage of PCT/EP2017/065043 filed Jun. 20, 2017, which claims priority of DK PA 2016 70445 filed Jun. 21, 2016 and DK PA 2016 70949 filed Nov. 30, 2016; each of which is hereby incorporated by reference in its entirety.

The present disclosure relates to a directional wireless hotspot device for communication in a mobile network, wherein a directional antenna can be rotated to point to a base station in the mobile network. The disclosure further relates to a method for controlling the rotation of the device.

BACKGROUND OF INVENTION

Mobile hotspots (sometimes referred to as portable hotspots) are devices that provide wireless access to mobile networks (or cellular networks), such as mobile phone networks. The mobile network is typically distributed over land areas called cells, each served by at least one fixed-location transceiver, also known as a base station. The base station provides the cell with the network coverage which can be used for transmission of voice, data and others. Mobile hotspots allow the user(s) to connect local devices to the mobile network via the mobile hotspot, which has a radio connection to at least one of the base stations and a local connection, such as a Wi-Fi connection, to the local device.

The signal-to-noise ratio (SNR) for the radio connection between the hotspot and the base station influences the performance of the system. In radio communication, an omnidirectional antenna is a class of antenna which radiates radio wave power uniformly in all directions in one plane, with the radiated power decreasing with elevation angle above or below the plane, dropping to zero on the antenna's axis. Omnidirectional antennas are used in mobile devices since they typically work well even if the device is physically moved or rotated. The disadvantage of an omnidirectional antenna compared to a directional antenna (also referred to as a beam antenna) is that the gain (which coincides with the performance) is lower.

Mechanically steerable single directional antennas can typically achieve hemispherical coverage with higher performance than omnidirectional antennas. However, the control of the mechanical parts is complex and expensive and the user will typically have to inform the device of a suitable direction for the antenna to point in or adjust the antenna manually.

SUMMARY OF INVENTION

The present disclosure relates to an assembly of components and elements, including a directional antenna, the assembly being capable of automatically pointing the directional antenna to a base station (fixed transceiver) in a mobile network. More specifically the disclosure relates to a directional wireless hotspot device for communication in a mobile network having a number of distributed cells, each cell covered by at least one fixed transceiver, the device comprising:
- a printed circuit board (PCB);
- a directional antenna;
- a compass, such as a magnetometer;
- a geographical positioning device, such as a GPS receiver;
- an electric motor, such as a substantially flat piezoelectric motor, for rotating the printed circuit board around an axis substantially perpendicular to the directional antenna;
- a wireless modem, such as a 3G/4G/LTE/5G modem, or a receiving element, such as a socket, arranged to receive an external wireless modem;
- a local communication element, such as a Wi-Fi circuit, for communication with a local device;
- a microprocessor configured to calculate an azimuthal rotation angle for pointing the directional antenna to one of the fixed transceivers based on:
   directional and positional data from the compass and geographical positioning device;
   positional data of the fixed transceivers;
- a housing.

Preferably at least the antenna, the compass, the electric motor and the wireless modem are mounted on the printed circuit board, and the electric motor comprises a first motor part rigidly connected to the printed circuit board and a second motor part rigidly connected to the housing. In this embodiment, the printed circuit board and the housing are rotatable in relation to each other Based on directional and positional data from the compass and the GPS, and positional data of the fixed transceivers, the microprocessor calculates and controls the pointing direction of the directional antenna. The mobile hotspot may be a portable device, which can either be placed on almost any surface or mounted on for example a vehicle.

The assembly provides a high gain directional antenna in a mobile network. The assembly has the advantage that the electric motor, preferably a piezoelectric motor, has a first motor part which is mounted directly on the PCB and a second motor part which rotates in relation to the PCB and is rigidly connected to the housing. This design, wherein the rest of the components, including the directional antenna, are mounted on the PCB, provides a robust and compact system. In one embodiment there are no complex mechanical motions, only a rotation of the PCB in relation to the housing. In particular, if the directional antenna is a planar antenna, such as a Vivaldi antenna, the system can also be made very thin. If the antenna is placed on one side of the PCB and the rest of the components, including the motor, on the opposite side of the PCB, the space is further optimized. The presently disclosed implementation of the assembly facilitates a simpler production process.

The presently disclosed directional wireless hotspot device may further comprise one or more slip rings for transmission of power from the battery to the printed circuit board and/or for transmission of data signals between the printed circuit board and additional components and processing units inside or outside the housing. Slip rings are useful for transmitting power and/or electrical signals from a stationary to a rotating structure. However, transmission of RF signals and complex signals from the antenna are typically challenging to transmit by means of slip rings. Therefore, the presently disclosed directional wireless hotspot device, wherein the directional antenna and the processing unit for processing the antenna signals are mounted on the rotatable printed circuit board, provides a simple way of processing the signals received by the antenna without transmitting the signals through a slip ring.

In order to overcome the challenge related to transferring power and/or data signals between the rotating and non-rotating parts the directional wireless hotspot device may be arranged such that rotation of the antenna more than a predefined angle, such as 360° or 540° or 720°, is prevented. When the predefined angle is reached, the antenna can be moved back for example 360° or a value corresponding to the predefined angle, to prevent the cables are coiled around the axis. The position in relation to the predefined angle can be controlled by the microcontroller. In one embodiment the transmission of electric signals and/or power to/from the rotatable printed circuit board is provided by a flexible arrangement of the cables, preferably such that the cables can withstand a rotation corresponding to at least the predefined angle.

The PCB piezo motor is preferably flat and mounted directly on the PCB. The motor has a rotatable rotor, which can be connected to an element attached to the housing. The design thereby implements a complete rotatable system, which is both robust and flat.

The present disclosure further relates to a method for automatically pointing a directional antenna of a wireless communication device to a fixed transceiver in a mobile network having a plurality of distributed cells, each cell covered by at least one fixed transceiver, the method comprising the steps of:
 a) identifying a cell ID of a cell associated with the wireless communication device, preferably a cell which the wireless communication device camps on;
 b) obtaining or extracting positional data for the fixed transceiver associated with the cell ID;
 c) obtaining a reference azimuth corresponding to the direction of the directional antenna in a horizontal plane;
 d) obtaining a local position of the directional antenna;
 e) based on the positional data for the fixed transceiver and the local position of the directional antenna, calculating a pointing azimuth between the directional antenna and the fixed transceiver;
 f) calculating an azimuthal rotation angle between the reference azimuth and the pointing azimuth;
 g) rotating the directional antenna towards the fixed transceiver based on the calculated azimuthal rotation angle;
 h) continuously, or at intervals, repeating steps a-g.

The presently disclosed device may use the method for automatically pointing its directional antenna to a base station in the mobile network it is active in. The method can be said to employ dynamic handling of the direction based on the position of the device in relation to a plurality of base stations. The device will either know the positions of the base stations and update its own position and direction continuously, or receive information from the base stations. The device using the method is thereby functional both when it stands still and camps on one cell and in mobility scenarios, for example when the device is mounted or placed in a moving vehicle or vessel. The method handles mobility scenarios dynamically, preferably in substantially real-time, and may for example update the cell ID, positional data of the corresponding fixed transceiver, pointing azimuth and azimuthal rotation angle based on a new cell when the wireless communication device is updated to camp on a new cell of the mobile network in a reselection process.

These and other aspects of the invention are set forth in the following detailed description if the invention.

DETAILED DESCRIPTION OF THE INVENTION

Figure 1A:
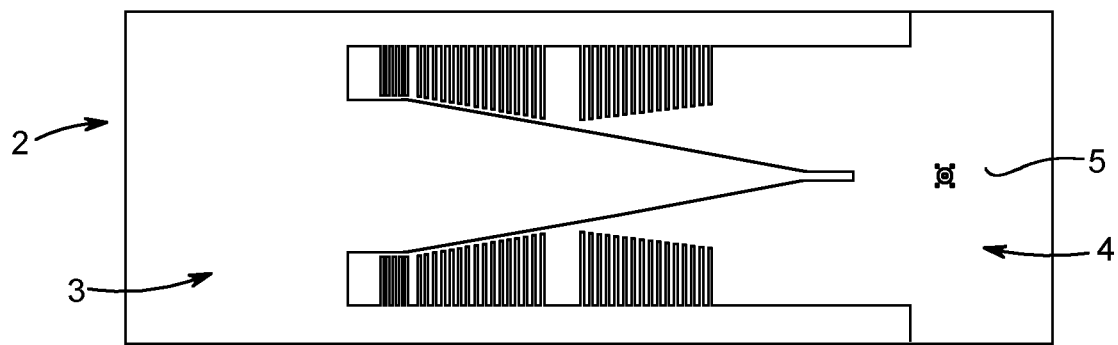
FIGS. 1a and 1b show a first embodiment of the PCB subsystem. In this embodiment a Vivaldi antenna is mounted on the front side of the PCB (FIG. 1a) and the rest of the components of the PCB subsystem on the backside of the PCB (FIG. 1b).

The present disclosure relates to a directional wireless hotspot device for communication in a mobile network having a number of distributed cells, each cell covered by at least one fixed transceiver. In a first embodiment the device comprises:
 a printed circuit board (PCB);
 a directional antenna;
 a compass, such as a magnetometer;
 a geographical positioning device, such as a GPS receiver;
 an electric motor, such as a substantially flat piezoelectric motor, for rotating the printed circuit board around an axis substantially perpendicular to the directional antenna;
 a wireless modem, such as a 3G/4G/LTE/5G modem;
 a local communication element, such as a Wi-Fi circuit, for communication with a local device;
 a microprocessor configured to calculate an azimuthal rotation angle for pointing the directional antenna to one of the fixed transceivers based on:
  directional and positional data from the compass and geographical positioning device;
  positional data of the fixed transceivers;
 a housing;
 wherein the antenna, the compass, the electric motor and the wireless modem are mounted on the printed circuit board, and wherein the electric motor comprises a first motor part rigidly connected to the printed circuit board and a second motor part rigidly connected to the housing. Optionally, other components, such as the geographical positioning device, the local wireless communication element and the microprocessor may also be mounted on the PCB.

Preferably, the printed circuit board and the antenna, the compass, the geographical positioning device, the electric motor, the wireless modem, the local wireless communication element and the microprocessor (or the rest of the components) may form a PCB subsystem. The first and second motor parts may be rotatably connected such that the PCB subsystem can be rotated in relation to the housing.

In a second embodiment the housing and PCB may be rigidly connected to each other and rotatably connected to a further fixed element, such as a plate, on which the assembly stands. The fixed element connected to the rest of the assembly may be placed for example on a plane surface or attached to any other fixed surface, such as a roof or furniture. In one embodiment, the antenna is mounted on the printed circuit board, wherein the printed circuit board and the housing are rigidly connected, and wherein the housing and printed circuit board are horizontally rotatable in relation to a further fixed element such as a plate. The rotatable connection between the PCB and the fixed element may be of the same type and involving the same components as the connection between the PCB and the housing in the first embodiment, i.e. involving an electric motor having two parts that are rotatable in relation to each other. Therefore, in one embodiment the electric motor comprises a primary motor part rigidly connected to the printed circuit board and secondary motor part rigidly connected to the fixed element.

One of the advantages of using as fixed element as a base, in relation to which the rest of the directional wireless hotspot device is rotatable, is that a slot or a receiving element, such as a socket, can be arranged to receive an external wireless modem. Preferably, the receiving element for an external wireless modem can be arranged on the housing, or at least accessible from the housing. The wireless modem may be for example a USB modem, which can be plugged in directly on/in the housing by a user. In this embodiment, the directional wireless hotspot device may be arranged to use the external wireless modem for example as in its normal setup, but using the directional antenna of the directional wireless hotspot device through an antenna connection of the wireless modem. Therefore, in one embodiment the device is arranged to communicate wirelessly with a base station using the directional antenna of the directional wireless hotspot device and an external wireless modem, such as a USB wireless modem.

The directional wireless hotspot device may further comprise a SIM card holder. The directional wireless hotspot device may either have its own SIM card holder, or, as an alternative, the external wireless modem may include the SIM card holder. The directional wireless hotspot device may further comprise an eSIM or soft SIM. The SIM card/SIM card holder may be placed either in the rotating (in relation to the housing) part, as part of the PCB subsystem, or in the fixed part, such as in the bottom side of the housing.

As stated, some of the advantages of the device are that it can achieve a high gain directional antenna in a mobile network and that the electric motor, preferably a piezoelectric motor, has a first motor part which is mounted directly on the PCB and a second motor part which rotates in relation to the PCB and is rigidly connected to the housing. This design, wherein the rest of the components, including the directional antenna, are mounted on the PCB, provides a robust and compact system. There are no complex mechanical motions, only a rotation of the PCB in relation to the housing (first embodiment).

In one embodiment the antenna is mounted on the front side of the printed circuit board and the compass, the electric motor, the wireless modem are mounted on the backside of the printed circuit board. The rest of the components are preferably also mounted on the backside of the PCB, but may in principle also be placed somewhere else in the housing and connected to the PCB subsystem through slip rings.

Figure 12:
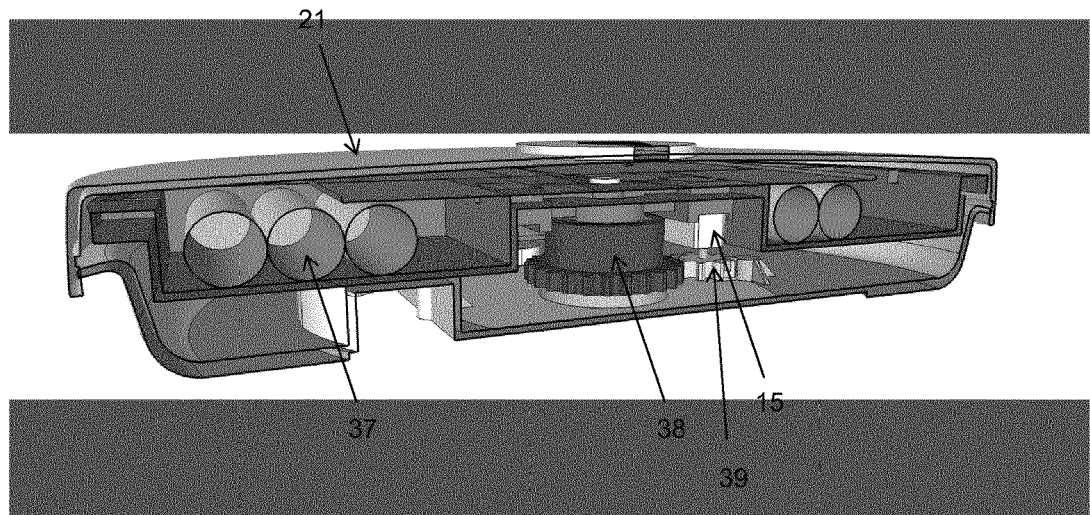
FIG. 12 shows a further embodiment of the directional wireless hotspot device.
Figure 13:
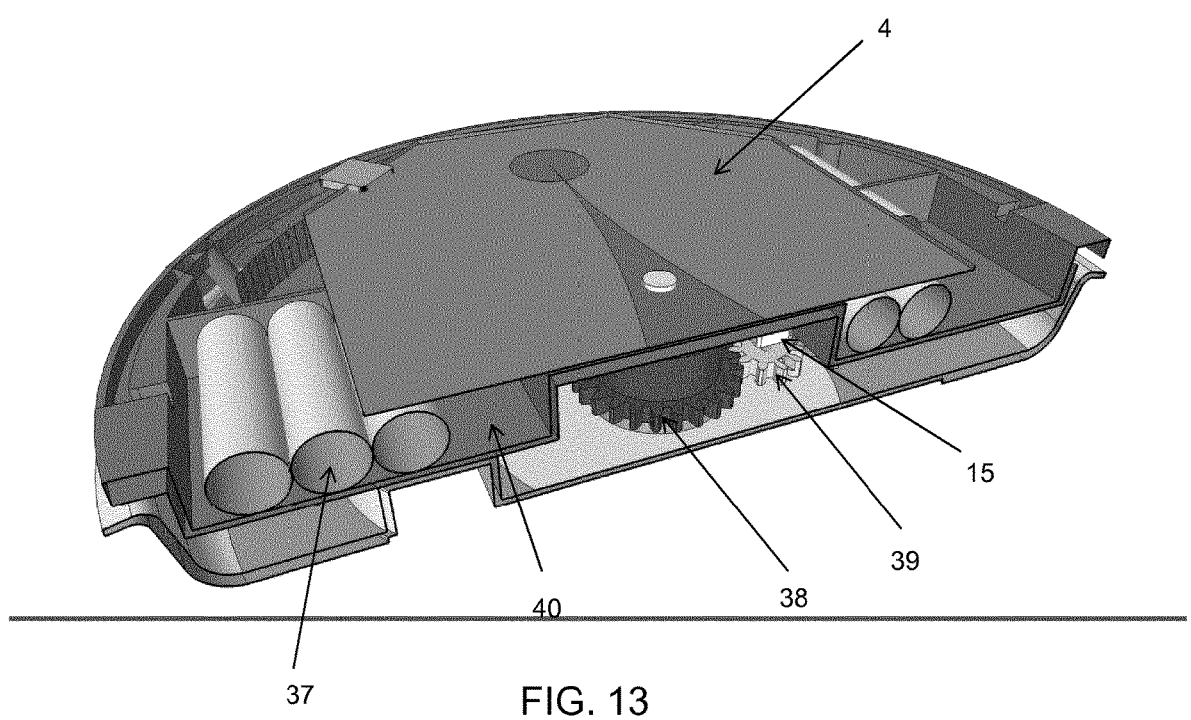
FIG. 13 shows the directional wireless hotspot device of FIG. 12 from a different angle.

The power source of the components may be placed on the PCB in the form of a battery, such as a rechargeable battery. Hence, in one embodiment the device further comprises a battery and/or a power supply mounted on the PCB. The power source may comprise one or several batteries. The power source/battery may be part of the PCB subsystem and do not necessarily have to be placed on the PCB itself. The PCB subsystem may comprise additional elements, such as a holding or assembling element made of for example plastics, arranged to hold the parts of the PCB subsystem together. The PCB subsystem may thereby be seen as an assembly of components that can be rotated in relation to the housing by means of an electric motor. FIG. 12-13 show an arrangement in which a number of batteries (37) are arranged in a PCB subsystem on an assembling element (40) which is also part of the PCB subsystem. The fact that the directional wireless hotspot device comprises a compass function for proving directional data may render the device sensible for magnetic interference. The inventors have realized that by integrating the battery in the rotating subsystem, possibly in combination with shielding of the compass, magnetic fluctuations between the compass and battery is reduced. Since the position of the battery is fixed in relation to the magnet, an initial calibration may be enough to have the system functional. Alternatively, the battery and/or power supply is/are mounted on the housing, wherein the device further comprises a first slip ring for transmission of power from the battery to the printed circuit board. There may also be an external power source, preferably connected to the battery. Hence, a battery could also be placed in the housing but not on the PCB, for example in order to make the PCB system lighter. The same goes for some of the components that could communicate through slip rings. The device may therefore further comprise at least one additional slip ring(s) for transmission of electric signals to/from the rotatable printed circuit board. RF signals and complex signals from the antenna are typically challenging to transmit by means of slip rings. Therefore, the presently disclosed directional wireless hotspot device, wherein the directional antenna and the wireless are mounted on the printed circuit board, provide a simple way of processing the signals received by the antenna without transmitting the signals through a slip ring.

The microprocessor may be a separate component. Alternatively, processing capacity of the wireless modem may be used for additional tasks such as calculating the direction and controlling the electric motor. The microprocessor may be configured to control the electric motor to rotate the directional antenna such that it points to one of the base stations in the mobile network. The base station, towards which the directional antenna is pointed, preferably corresponds to the base station associated with a cell in the network which the device camps on. When reselection occurs, the device may be updated dynamically such that the directional antenna always points to the cell which the device camps on.

The presently disclosed directional wireless hotspot device may be operational in any mobile network, using any communication standard or protocol, including GSM, UMTS, LTE, HSDPA, HSUPA, HSPA+, TD-SCDMA, CDMA and WiMAX based networks, or mobile telecommunication technology of any generation, including 3G, 4G and 5G. The device may be configured to operate in a range of frequencies, such as in the range of 500 MHz to 60 GHz, or in the range of 700 MHz to 30 GHz, or in the range of 700-2600 MHz, or specifically in the range of 1600-2800 MHz or in the range of 1800-2600 MHz.

The maximum height of the PCB subsystem depends on which antenna and other components are used, and how they are mounted on the PCB. By using a planar antenna, a very thin and compact PCB subsystem may be achieved. In one embodiment, the maximum height of the PCB subsystem is less than 20 mm, preferably less than 15 mm, more preferably less than 10 mm, even more preferably less than 7 mm.

Directional Antenna

The directional antenna plays a central role in the presently disclosed directional hotspot device. In order to make the design as thin and compact as possible a planar antenna, such as a Vivaldi antenna may be used. A Vivaldi antenna is a co-planar broadband-antenna, which is made from a metalized dielectric plate. The feeding line, which may have a shape of a hollow tube, typically excites a circular space via a microstrip line, terminated with a sector-shaped area. From the circular resonant area the energy reaches an exponential pattern via a symmetrical slot line. Alternatively, the directional antenna may be a parabolic antenna. In the case of a Vivaldi antenna, the antenna may be made of a metal sheet, such as a copper sheet. As stated, by using a planar antenna a very thin and compact PCB subsystem may be achieved. In such a case the planar directional antenna may have a maximum height of less than 2 mm, or less than 1 mm. The length of the planar directional antenna may be for example 5-30 cm, or 10-30 cm, or 10-20 cm. In one embodiment, the directional antenna is a piece of metal foil, which may for example be glued or otherwise attached to the PCB or on a plastic cover of the PCB subsystem.

Figure 3:
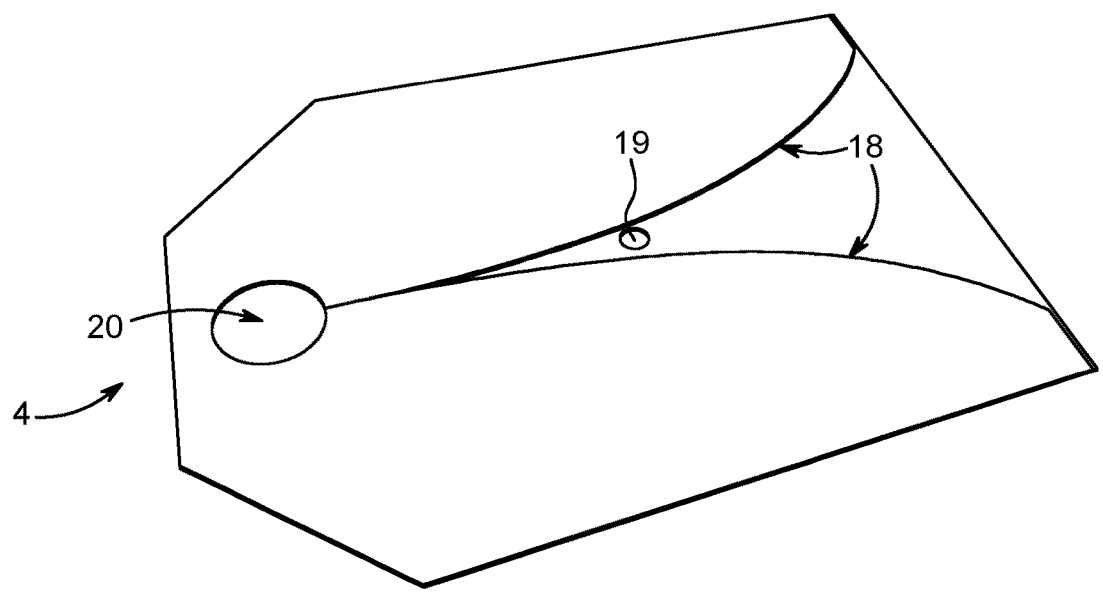
FIG. 3 shows one example of a planar directional antenna, a Vivaldi antenna.

The planar directional antenna, such as a Vivaldi antenna, is preferably designed for optimization of the antenna gain for a specific frequency range. In one example a Vivaldi antenna is designed to achieve to deliver a gain of 8-12 dBi from 1.8-2.6 GHz without radome and 8.4-12 dBi from 1.8-2.6 GHz with radome. Such a design is shown in FIG. 1a. This Vivaldi antenna comprises one metal sheet having a tapered slot. The Vivaldi antenna (4) in this embodiment has one upper and one lower part of one metal sheet defining a tapered slot in between, wherein the upper and lower parts have sub-slots (grooves) substantially perpendicular to the tapered slot. A further embodiment of a Vivaldi antenna is shown in FIG. 3. This embodiment also has a circular cut out to the left in the drawing in the solid section of the Vivaldi antenna (i.e. where there is no tapered slot).

In the presently disclosed directional wireless hotspot device the PCB may also have a substantially circular shape. For such an embodiment, the planar directional antenna may also be substantially circular, or at least a section of the planar directional antenna follows the circular edge of the PCB. The Vivaldi antenna and printed circuit board may also have coinciding holes in the centre of the printed circuit board and antenna. The reason for such a design is that a rod may be rigidly connected between the second motor part and the housing through the holes. In one embodiment the PCB is circular and the antenna covers at least 50% of the printed circuit board area, or at least 60% of the printed circuit board area, or at least 70% of the printed circuit board area.

The directional antenna may be mounted on a first side, preferably an upper side or a front side, of the printed circuit board. The directional antenna may be glued, bolted or attached to the PCB in any suitable way. The printed circuit board and the directional antenna may thereby constitute one integrated element.

Furthermore, the directional antenna preferably comprises a feeding line, preferably in the shape of a hollow tube.

The directional wireless hotspot device may further comprise at least one secondary directional antenna. If more than one directional antenna are used the device may be arranged to handle multiple parallel wireless data signals (MIMO). Therefore, in one embodiment the directional antenna and the at least one secondary directional antenna are configured to receive and/or transmit multiple data signals by exploiting multipath propagation in the antennas.

The directional antenna and the at least one secondary directional antenna may be planar antennas, such as Vivaldi antennas. In one embodiment, the planar antennas and/or Vivaldi antennas are mounted on the printed circuit board side by side. The tapered slots of the Vivaldi antennas are preferably arranged in the same direction.

In the case of multiple parallel wireless data signals using several directional antennas, the data paths may further comprise supplementary omnidirectional antennas for each of the directional antenna and the at least one secondary directional antenna. Similarly, there may be separate Wi-Fi circuits for each of the directional antennas.

Electric Motor

The electric motor for rotating the printed circuit board around an axis substantially perpendicular to the directional antenna (z axis) is preferably a substantially flat piezoelectric motor. A piezoelectric motor or piezo motor is a type of electric motor based upon the change in shape of a piezoelectric material when an electric field is applied. A PCB motor may be mounted directly on the PCB. A stator may be milled out of the PCB itself while the rotor may be pressed onto the surface of the stator and delivers the mechanical output. The design can be made very flat and compact and the motor may be controlled directly by a microcontroller on the PCB. The first part of the electric motor is a frame mounted on the printed circuit board. The frame may have a length of 10-50 mm, or 30-50 mm and a width of 10-50 mm, or 30-50 mm. The second part of the electric motor is a ring inside the frame, the ring being rotatable in relation to the frame. This ring may be referred to as the rotor. The rotor ring may be placed on top of a stator ring rigidly connected to the frame. The second part (rotor) may be rigidly connected to a plate substantially parallel to the printed circuit board, wherein the plate is fixed to the housing. As stated, the movement of the electric motor is typically controlled by a processing unit.

In the case where the directional antenna is mounted on the front side of the PCB, the electric motor may be mounted on a second side of the printed circuit board, such as a lower side or a backside.

The motor may, alternatively, be a stepper motor, such as a brushless DC electric motor that divides a full rotation into a number of equal steps. Alternatively, the motor may be a synchronous electric motor or any type of electric motor, for example a 12V DC motor, configured to rotate the printed circuit board around an axis. The size of the motor is preferably adapted for a specific size of the parts to rotate in a specific embodiment, and which parts that are selected as being part of the rotatable part of the device.

Additional Components: Compass, GPS, Navigation Reference Unit, Gyro, Accelerometer, Gimbal etc.

The directional wireless hotspot device comprises a geographical positioning device, such as a GPS receiver. The geographical positioning device is arranged to provide a local position of the directional antenna, which can be used to locate the device in relation to base stations.

Furthermore, information regarding the direction of the directional antenna is needed to calculate an azimuthal rotation angle for pointing the directional antenna to a given base station. The reference azimuth may correspond to the direction of the directional antenna in a horizontal plane. For this purpose a compass function, i.e. a device that is capable of providing a direction of the directional antenna, is needed. The compass may be any available compass solution, including a magnetic compass, gyro compass, solid state compass or even the GPS. In one embodiment a magnetometer is used as compass. The magnetometer is preferably mounted on the PCB with the directional antenna. The device may further comprise a secondary compass, optionally a tertiary compass in order to be able to handle external interfering magnetic field. The device may thereby be configured to use any of the two or three compasses, or a combination, or a calculated value thereof, to determine a correct direction.

The directional wireless hotspot may further comprise a navigation reference unit for adding more precise handling of the direction of the directional antenna. One example of an advanced navigation reference unit is the LT-1000 NRU device which includes 12 precision sensors (magnetometers, gyros, accelerometers, barometer, thermometer, and GNSS). The navigation reference unit uses sensor fusion and Kalman filtering and outputs information about true heading, roll, pitch, position, ground speed, course over ground, with high precision and resolution. This information may be used to improve the precision of the directional wireless hotspot and for handling more complex movement scenarios. Therefore, in one embodiment the navigation reference unit is configured to Kalman filter data from the compass, the geographical positioning device, the gyro and the accelerometer to obtain a more accurate direction of the directional antenna.

The directional wireless hotspot device may comprise a gyro for assisting the compass in compensating and/or handling sudden change of direction of the antenna. The directional wireless hotspot device may also comprise an accelerometer for measuring roll and/or pitch of the device, and/or compensating for the device not being in a horizontal position.

The directional wireless hotspot device may have a local wireless communication element, such as a Wi-Fi circuit, for communication with a local device. The directional wireless hotspot device may have connectors for connecting the local wireless communication element to an external antenna, such as a Wi-Fi antenna, for improved local wireless communication.

In one embodiment of the presently disclosed directional wireless hotspot, the local communication element is a wireless communication element. The local wireless communication element may be a Wi-Fi circuit configured to communicate with a local user device, such as a mobile phone, tablet, PC or any device.

Alternative and further arrangements are possible. In one embodiment the directional wireless hotspot device comprising a first wireless component mounted on the printed circuit board, or rigidly connected to the printed circuit board, and a second wireless component mounted on the housing or the fixed element, wherein the two wireless components communicate wirelessly. This internal wireless communication in the device may avoid the transmission of complex data signals through slip rings between parts that are rotatable in relation to each other.

In one embodiment, the local communication element for communication with a user or the system of a user, such as a local network, may be connected by means of a network cable, such as an Ethernet cable. Therefore, the directional wireless hotspot device may further comprise a network port, such as an Ethernet port. In such a solution the network cable may serve both as a data carrier and as power supply. The network port may be adapted to receive electric power and send/receive data. The directional wireless hotspot device may further comprise a solar cell configured to charge the battery of the device. The solar cell may be connected directly to the battery or through a Power over Ethernet (PoE) connection.

Housing

The housing of the presently disclosed directional wireless hotspot device may take different shapes depending on the internal design of the PCB subsystem and other internal design choices. In one embodiment the housing is a relatively flat, cylindrical housing. The housing may have a substantially circular horizontal cross-section, such as a cylindrical shape or a tapered cylindrical shape as shown in FIGS. 4-7. The housing may be substantially cylindrical in order to host a rotating circular PCB. The housing may have a maximum height of 15 cm, or a maximum height of 12 cm, or a maximum height of 10 cm, or a maximum height of 5 cm.

The housing may have a tapered groove along the bottom side of the housing, the tapered groove having a shape extending upwards, the tapered groove configured to attach the device to a mounting on a wall, ceiling or rod. Further means for attaching the device to items vehicles, walls etc. are also possible. The device may also have a substantially flat bottom side on which the device stands.

The directional wireless hotspot device may further comprise a gimbal for maintaining the device in a horizontal position. A gimbal is a pivoted support that allows the rotation of an object about a single axis. For example, on a ship, some equipment use gimbals to keep them upright with respect to the horizon to compensate for the ship's pitching and rolling.

The housing may further comprise a transparent strip extending in a horizontal direction and around the housing. Inside the housing there may be an indication of the directional antenna that is visible from the outside of the housing through the transparent strip. This allows the user to be informed about the position of the antenna at all time.

Method for Automatically Pointing a Directional Antenna

The present disclosure further relates to a method for automatically pointing a directional antenna of a wireless communication device to a fixed transceiver in a mobile network having a plurality of distributed cells, each cell covered by at least one fixed transceiver, the method comprising the steps of:
  a. identifying a cell ID of a cell associated with the wireless communication device, preferably a cell which the wireless communication device camps on;
  b. obtaining or extracting positional data for the fixed transceiver associated with the cell ID;

c. obtaining a reference azimuth corresponding to the direction of the directional antenna in a horizontal plane;
d. obtaining a local position of the directional antenna;
e. based on the positional data for the fixed transceiver and the local position of the directional antenna, calculating a pointing azimuth between the directional antenna and the fixed transceiver;
f. calculating an azimuthal rotation angle between the reference azimuth and the pointing azimuth;
g. rotating the directional antenna towards the fixed transceiver based on the calculated azimuthal rotation angle;
h. continuously, or at intervals, repeating steps a-g.

The presently disclosed device may use the method for automatically pointing its directional antenna to a base station in the mobile network it is active in. The method can be said to employ dynamic handling of the direction based on the position of the device in relation to a plurality of base stations. The step of obtaining or extracting positional data for the fixed transceiver associated with the cell ID may be construed as having access to database, potentially a local database, comprising all coordinates of the relevant base stations, or, alternatively, that the network and/or the base stations information about the locations. The database may alternatively be a web-based database, allowing the device to be updated with changes in mobile network. The access to the database can be controlled directly by the user through a user interface, or automatically. The dynamic handling of a plurality of cells and bases stations in a network in combination with calculation and positioning of the directional antenna provides an efficient method for controlling the presently disclosed directional wireless hotspot device in a mobile network.

The method may also handle mobility scenarios, including reselection scenarios. If the wireless communication device is updated to camp on a new cell of the mobile network, for example due to the device moves geographically and the measured signal strength of one cell becomes stronger than the cell that the device camps on, the method may take this information into account and update the cell ID and consequently the positional data of the base station belonging to the cell, the pointing azimuth and the azimuthal rotation angle. Finally the direction of the directional antenna is changed accordingly.

The method may also use geographical information as well as historical and statistical information relating to measured signal strength and/or reselections for a known journey. Since the antenna is directional it is possible that it will not reselect to a cell A that is closer to the device than a cell B since the directional antenna points towards cell B. In this case the method may take into account the geographical data and point the directional antenna towards cell A, which will typically be selected. For a known journey, the method may take into account expected reselections based on previous reselections for the same journey. In one embodiment the reselection process is therefore based on information about the positions of the fixed transceivers and the local position of the directional antenna.

When the directional wireless hotspot device is switched on, an initialization process may be started, in which the device identifies and camps on a cell (with a base station) in the network. Positional data is obtained for the base station and based on the positional data the directional antenna is pointed towards the base station. Therefore an initialization sequence according to the present disclosure sequence may automatically point a directional antenna of a wireless communication device to a fixed transceiver in a mobile network having a plurality of distributed cells, each cell covered by at least one fixed transceiver, the method comprising the steps of:

a. identifying a cell ID of a cell associated with the wireless communication device, preferably a cell which the wireless communication device camps on;
b. obtaining or extracting positional data for the fixed transceiver associated with the cell ID;
c. obtaining a reference azimuth corresponding to the direction of the directional antenna in a horizontal plane;
d. obtaining a local position of the directional antenna;
e. based on the positional data for the fixed transceiver and the local position of the directional antenna, calculating a pointing azimuth between the directional antenna and the fixed transceiver;
f. calculating an azimuthal rotation angle between the reference azimuth and the pointing azimuth;
g. rotating the directional antenna towards the fixed transceiver based on the calculated azimuthal rotation angle;

The disclosed methods may be performed by embodiment of the presently disclosed directional wireless hotspot device.

IP codes define the ability of an object to resist dust and water. IP65 means dust-proof and wash-down capable. In one embodiment, the presently disclosed directional wireless hotspot device is provided in an IP65 classified variant. In this embodiment the configuration of the housing and other parts are arranged such that device is dust- and water-proof.

DETAILED DESCRIPTION OF DRAWINGS

The invention will in the following be described in greater detail with reference to the accompanying drawings. The drawings are exemplary and are intended to illustrate some of the features of the presently disclosed directional wireless hotspot device, and are not to be construed as limiting to the presently disclosed invention.

Figure 1B:
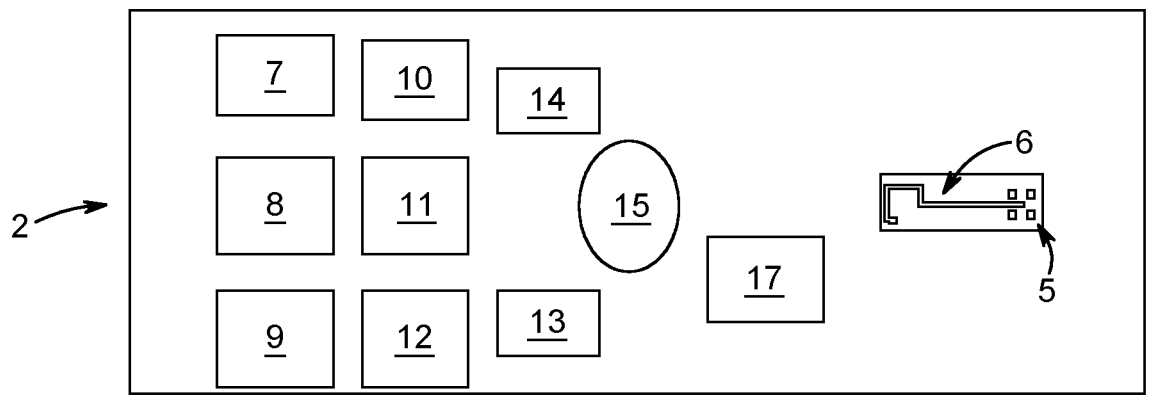

FIGS. 1a and 1b show a first embodiment of the PCB subsystem (2). In this embodiment a Vivaldi antenna (4) is mounted on the front side of the PCB (3) (FIG. 1a). The Vivaldi antenna (4) has SubMiniature version A (SMA) connectors (5). The Vivaldi antenna (4) in this embodiment has one upper and one lower part of one metal sheet defining a tapered slot in between, wherein the upper and lower parts have sub-slots (grooves) substantially perpendicular to the tapered slot. The backside of the PCB (3) (FIG. 1b) comprises the rest of the components, including a processing unit (7), a SIM card holder (8), a magnetometer (9), a wireless modem (10), a Wi-Fi circuit (11), a GPS (12), an accelerometer (13), a gyro (14), a piezoelectric motor (15), a processing unit (17) for controlling the piezoelectric motor (15), an antenna connection (6) for connecting the antenna (4) to other components such as the processing unit (7) and/or the wireless modem (10) and SMA connectors (5).

Figure 2A:
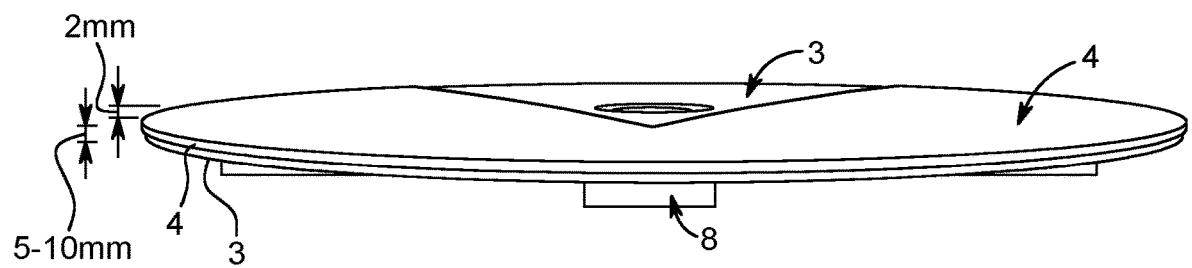
FIG. 2 shows an alternative embodiment of the PCB subsystem, wherein the antenna is mounted on the front side of a circular PCB (FIG. 2a) and the rest of the components of the PCB subsystem on the backside of the PCB (FIG. 2b)
Figure 2B:
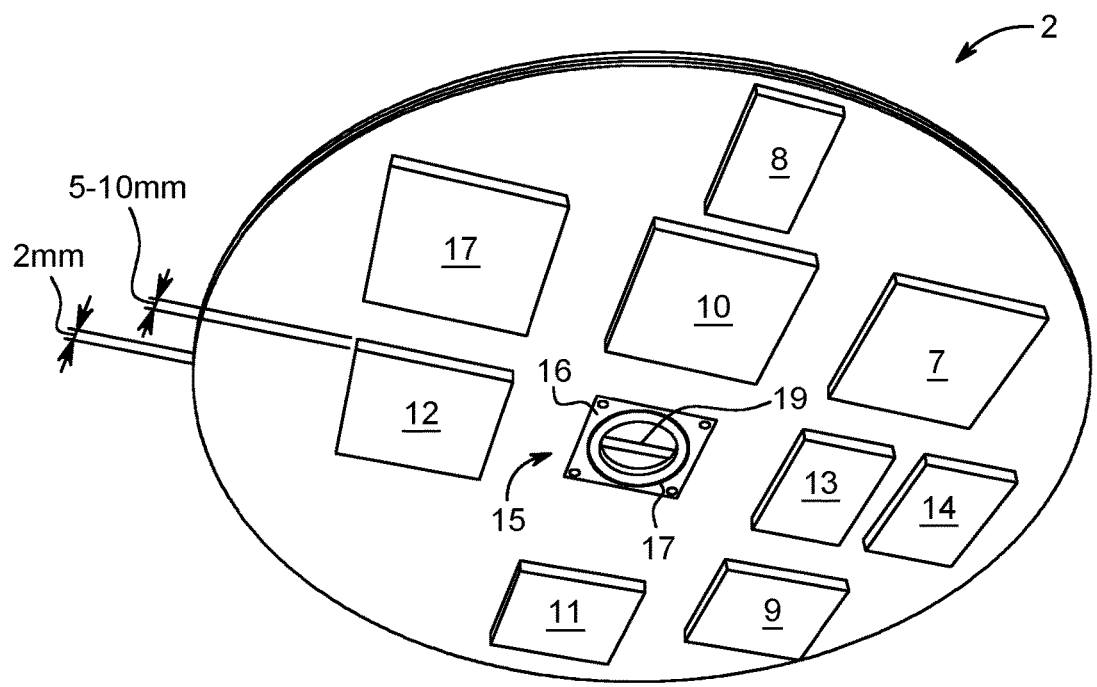

FIG. 2 shows an alternative embodiment of the PCB subsystem (2), wherein the (planar) antenna (4) is mounted on the front side of a circular PCB (3) (FIG. 2a). It is indicated that in this embodiment the planar antenna has a height of approximately 2 mm. The components, including a processing unit (7), a SIM card holder (8), a magnetometer (9), a wireless modem (10), a Wi-Fi circuit (11), a GPS (12), an accelerometer (13), a gyro (14), a piezoelectric motor (15), a processing unit (17) for controlling the piezoelectric motor (15) are mounted on the backside of the PCB (3). It is indicated that in this embodiment the PCB (3) and the components have a height of approximately 5-10 mm. The piezoelectric motor (15) has a frame (16) and a rotor ring (17). The PCB (3), the antenna (4) and the piezoelectric motor (15) have a coinciding hole (19).

FIG. 3 shows one example of a Vivaldi antenna (4) having a tapered slot. A metal sheet has one upper and one lower part, whose facing edges (18) define a tapered slot between the upper and lower parts. There is a hole (19) through the PCB (3) in the tapered slot. There is also a circular cut out (20).

Figure 4:
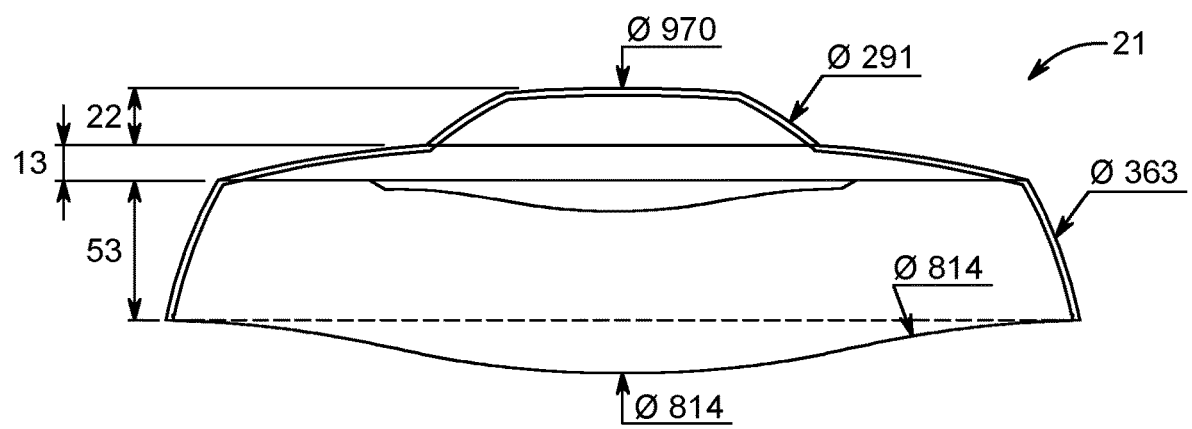
FIG. 4 shows one embodiment of an upper part of the housing of the wireless hotspot device.
Figure 5:
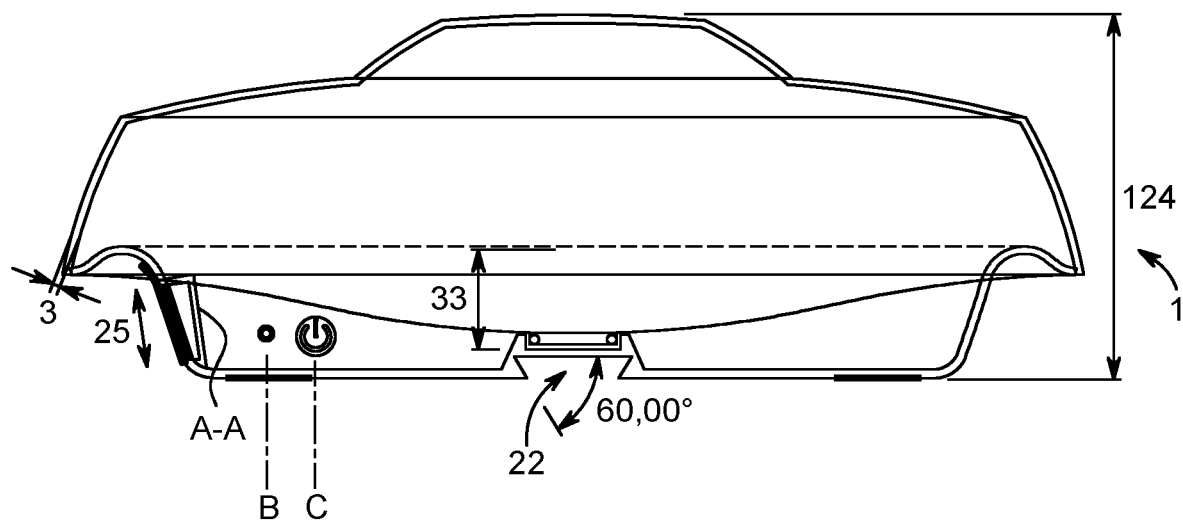
FIG. 5 shows one embodiment of the housing of the wireless hotspot device.
Figure 6:
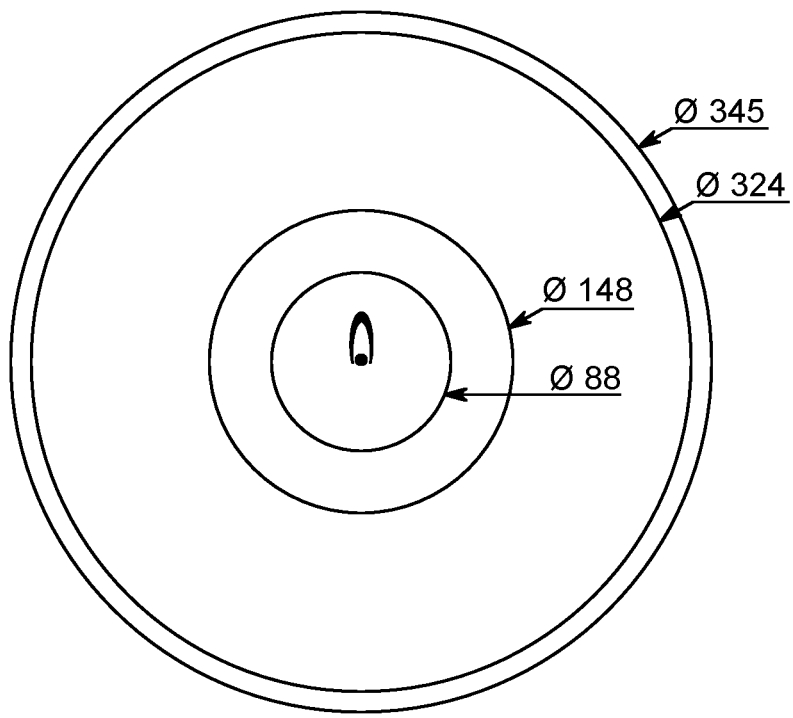
FIG. 6 shows a cross-section of one embodiment of the housing of the wireless hotspot device.
Figure 7:
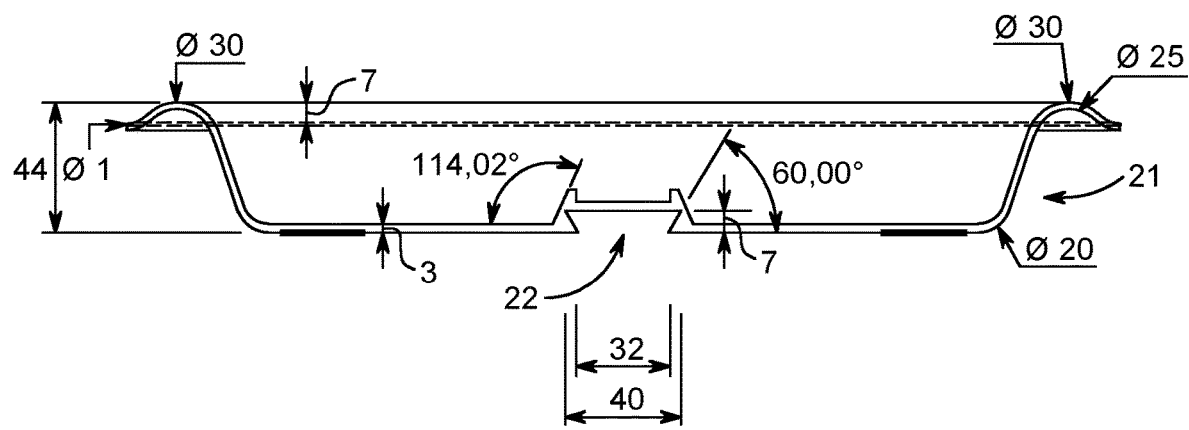
FIG. 7 shows one embodiment of a lower part of the housing of the wireless hotspot device.

FIGS. 4-7 show possible housing shapes. FIG. 4 shows one embodiment of an upper part of the housing (21) of the wireless hotspot device (1) with indications of dimensions. FIG. 5 shows one embodiment of the housing (21) of the wireless hotspot device (1) with dimensions. The housing (21) has a tapered groove (22) on the bottom side of the housing for attach the device to a mounting on a wall, ceiling or rod. FIG. 6 shows a cross-section of one embodiment of the housing of the wireless hotspot device (1). FIG. 7 shows the lower part of the housing (21) of the wireless hotspot device (1) with indications of dimensions.

Figure 8A:
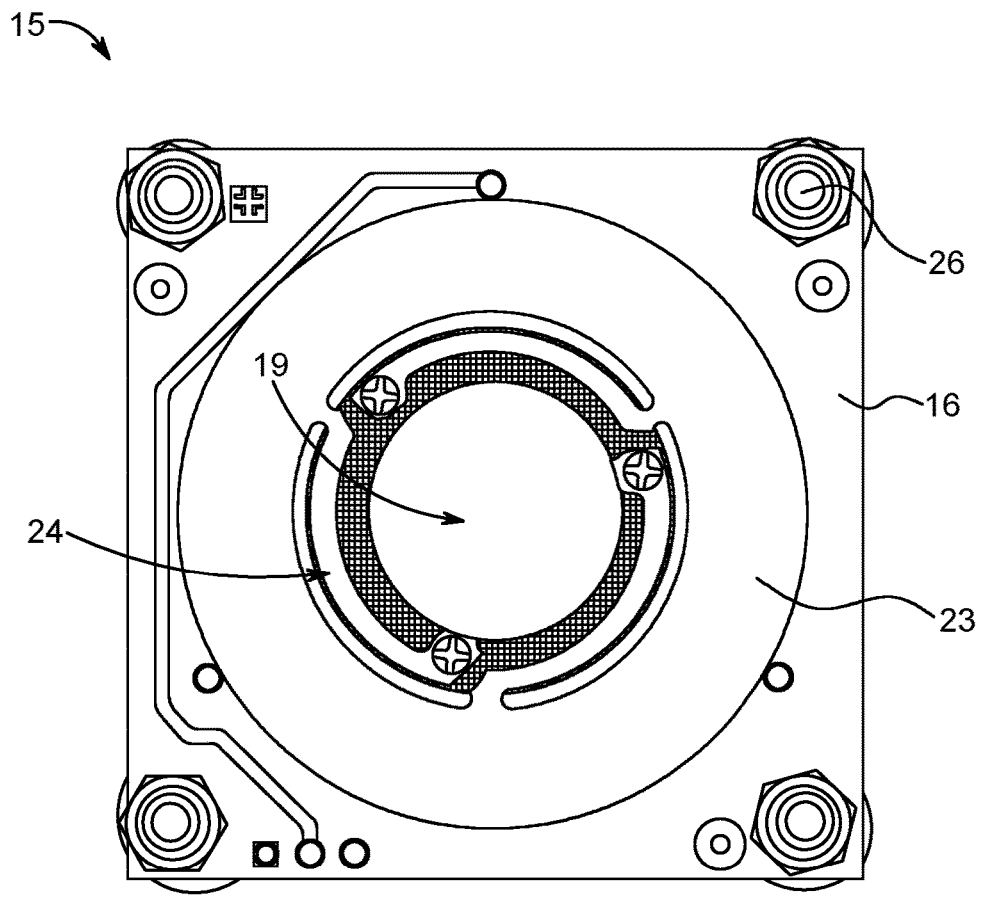
FIGS. 8a and b show one embodiment of a piezoelectric PCB-mounted motor.
Figure 8B:
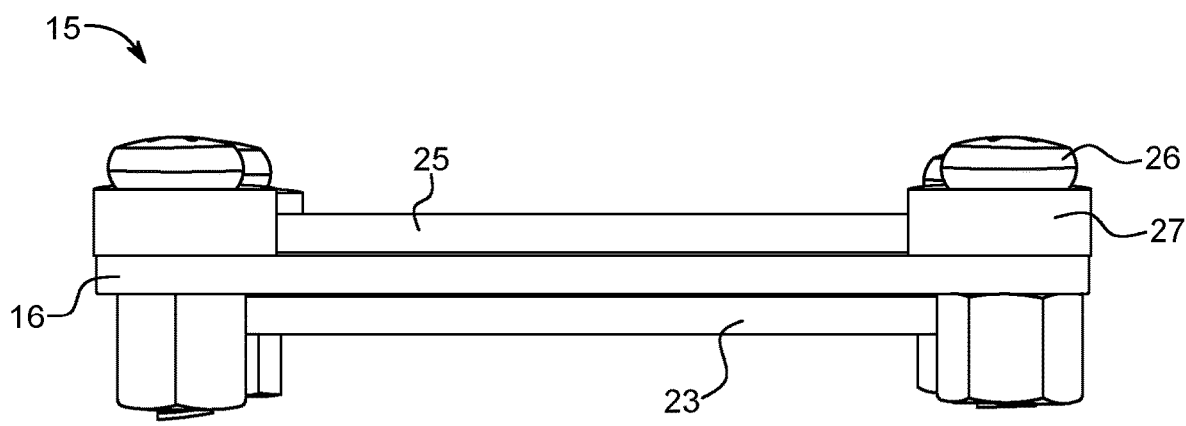

FIGS. 8a and b show one embodiment of a piezoelectric PCB-mounted motor (15). FIG. 8a is a front side view showing a frame (16) in the form of an additional PCB, which can be attached to the main PCB of the wireless hotspot device by means of a fastener, for example screws (26). The PCB motor has a disc (23) which is rotatable in relation to the frame (16). In this example the disc (23) has a divided inner ring (24), under which piezoelectric ceramics are used to push the ring, and thereby also the entire disc. The function of a piezoelectric motor would be clear to a person skilled in the art. The PCB motor (15) has a hole (19) in which a shaft could be attached. FIG. 8b is a side view of the the PCB motor (15). From this view it is seen that this example of a PCB moor has a second disc (25) on the backside which is rigidly connected to the disc (23) of the front side. The main PCB of the wireless hotspot device for this PCB motor could be arranged between the heads of the screws (26) and the stopper elements (27).

Figure 9:
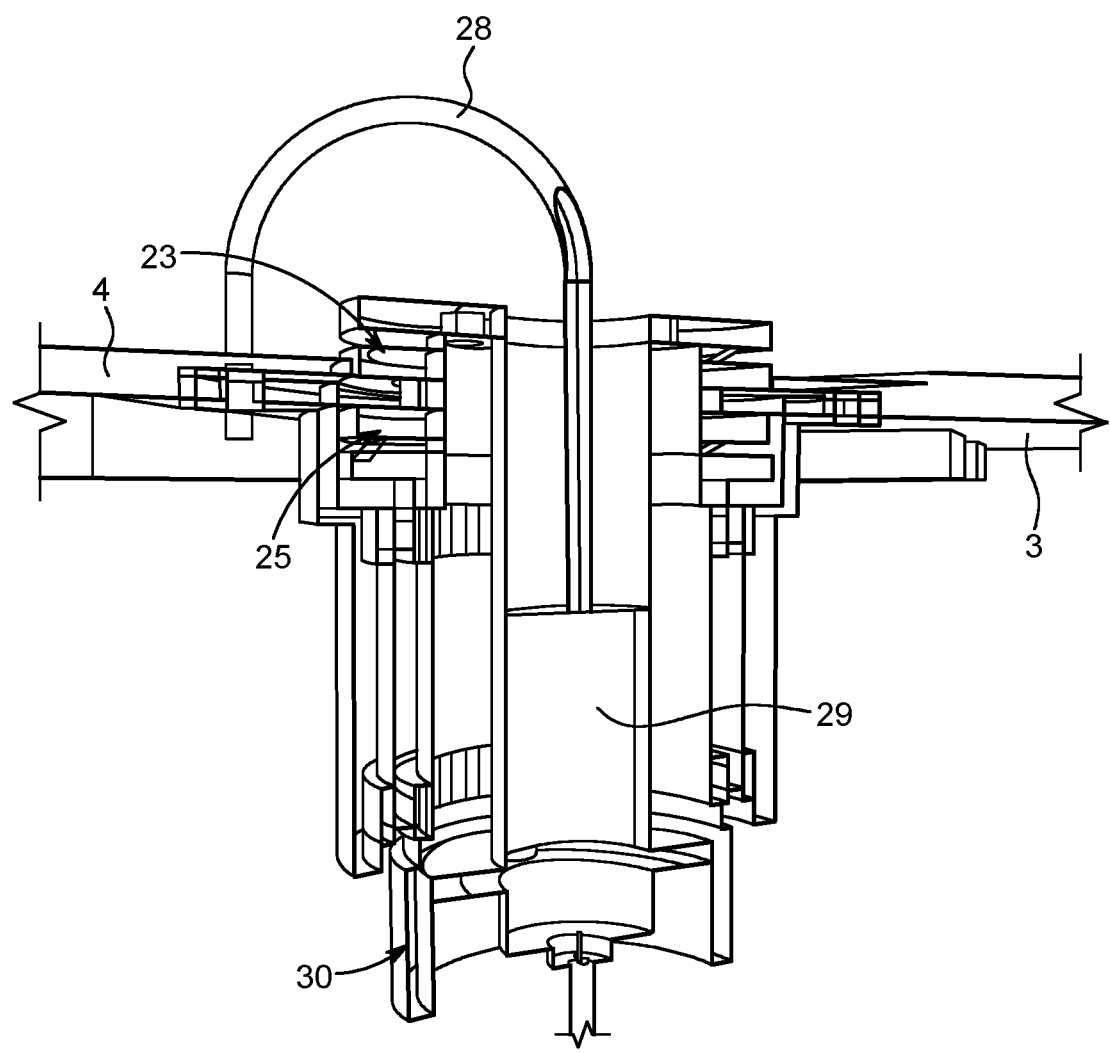
FIG. 9 shows one embodiment of a piezoelectric PCB-mounted motor mounted on a PCB with a slip ring in a hollow rigid shaft.

FIG. 9 shows one embodiment of a piezoelectric PCB-mounted motor mounted on a PCB (3) with a slip ring (29) in a hollow rigid shaft (30). The slip ring (29) has a slip wire (28), which delivers e.g. power to the PCB (3) through an opening in the Vivaldi antenna (4).

Figure 10:
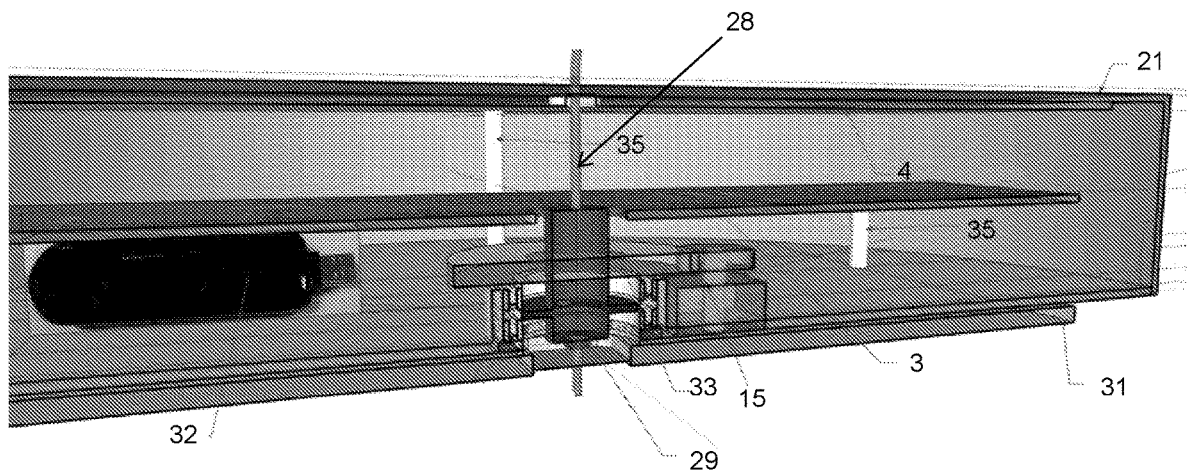
FIG. 10 shows one embodiment of the directional wireless hotspot device, wherein the printed circuit board and the housing are rigidly connected, and wherein the housing and printed circuit board are rotatable in relation to a fixed plate.

FIG. 10 shows one embodiment of the directional wireless hotspot device (1), wherein the printed circuit board (3) and the housing (21) are rigidly connected, and wherein the housing (21) and printed circuit board (3) are rotatable in relation to a fixed element (31) in the form of a plate. In this embodiment a directional antenna (4) is rigidly connected to the housing (21) in the upper part of the housing. Since the printed circuit board (3) and directional antenna (4) are rigidly connected in relation to the housing in this embodiment, the printed circuit board (3) and directional antenna (4) can be supported by supporting elements (35). An external USB wireless modem (32) illustrates that this embodiment may be adapted to receive an external wireless modem. A gear motor (15) having a cogwheel engages a second cogwheel (35) in order to rotate the directional wireless hotspot device (1) in relation to the fixed element (31). Furthermore, the assembly comprises a slip ring (29) and a slip wire (28).

Figure 11:
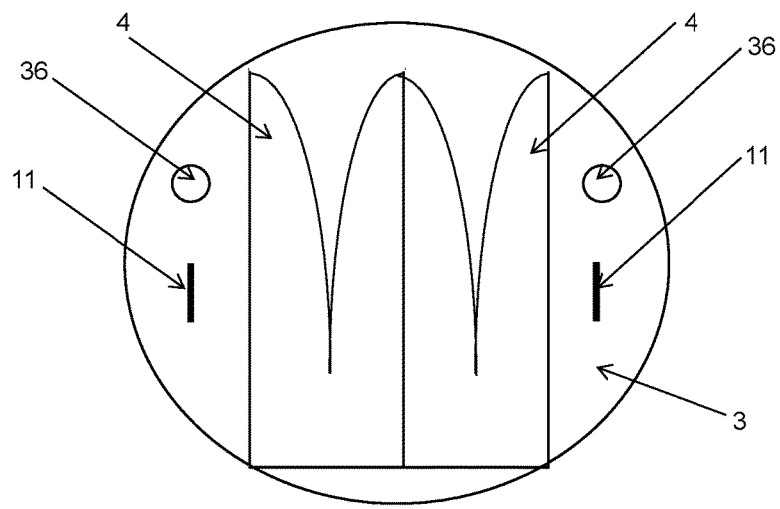
FIG. 11 shows a MIMO version of a printed circuit board comprising two Vivaldi antennas arranged side by side and pointing in the same direction.

FIG. 11 shows a MIMO version of a PCB (3) comprising two Vivaldi antennas (4) arranged side by side pointing in the same direction. Each data stream in this system has its own Vivaldi antenna (4), additional omnidirectional antenna (36) and Wi-Fi component (11). The PCB may further comprise a GPS (not shown).

FIG. 12 shows one embodiment of the directional wireless hotspot device (1) having an electric DC motor (15) connected to a cogwheel (39) engaging a second cogwheel (38) in order to rotate the directional wireless hotspot device (1). A number of batteries (37) are arranged in a PCB subsystem on an assembling element (40) which is also part of the PCB subsystem FIG. 13 shows the directional wireless hotspot device (1) of FIG. 12 from a different angle.

Figure 14:
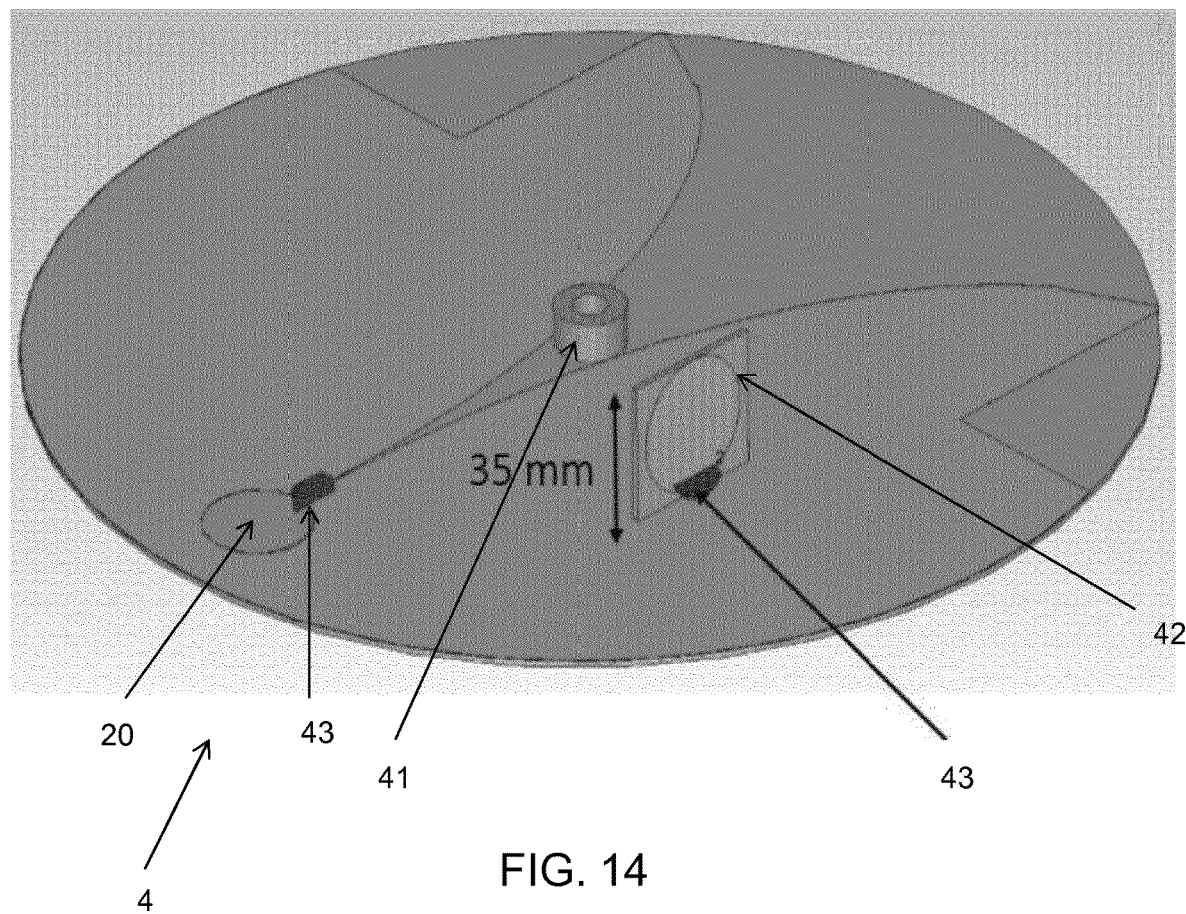
FIG. 14 shows one embodiment of a planar directional antenna, a Vivaldi antenna, and an omnidirectional antenna.

FIG. 14 shows a further example of a Vivaldi antenna (4) having a tapered slot, wherein the antenna (4) is mounted on the front side of a circular PCB. The antenna has a circular cut out (20). There is also an additional omnidirectional antenna (42). Both the Vivaldi antenna (4) and the omnidirectional antenna (42) have feedings (43). There is a hole through the circular PCB in the center of the PCB and a connection element (41) for holding the rotatable PCB subsystem.

Further Details of the Invention

The invention will now be described in further detail with reference to the following items:

1. A directional wireless hotspot device for communication in a mobile network having a number of distributed cells, each cell covered by at least one fixed transceiver, the device comprising:
   a printed circuit board;
   a directional antenna;
   a compass, such as a magnetometer;
   a geographical positioning device, such as a GPS receiver;
   an electric motor, such as a substantially flat piezoelectric motor, for rotating the printed circuit board around an axis substantially perpendicular to the directional antenna;
   a wireless modem, such as a 3G/4G/LTE/5G modem, or a receiving element, such as a socket, arranged to receive an external wireless modem;
   a local communication element, such as a Wi-Fi circuit, for communication with a local device;
   a microprocessor configured to calculate an azimuthal rotation angle for pointing the directional antenna to one of the fixed transceivers based on:
      directional and positional data from the compass and geographical positioning device;
      positional data of the fixed transceivers;
   a housing.

2. The directional wireless hotspot device according to any of the preceding items, wherein the antenna, the compass, the electric motor and the wireless modem are mounted on the printed circuit board, and wherein the electric motor comprises a first motor part rigidly connected to the printed circuit board and a second motor part rigidly connected to the housing.

3. The directional wireless hotspot device according to any of the preceding items, wherein the printed circuit board and the housing are rotatable in relation to each other.

4. The directional wireless hotspot device according to any of the preceding items, wherein the printed circuit board, the antenna, the compass, the geographical positioning device, the electric motor, the wireless modem, the local communication element and the microprocessor form a PCB subsystem, and wherein the first and second motor parts are rotatably connected such that the PCB subsystem is rotatable in relation to the housing.

5. The directional wireless hotspot device according to item 1, wherein the antenna is mounted on the printed circuit board, wherein the printed circuit board and the housing are rigidly connected, and wherein the housing and printed circuit board are horizontally rotatable in relation to a further fixed element such as a plate.

6. The directional wireless hotspot device according to item 5, wherein the electric motor comprises a primary motor part rigidly connected to the printed circuit board and secondary motor part rigidly connected to the fixed element.

7. The directional wireless hotspot device according to any of items 5-6, wherein the device is arranged to communicate wirelessly with a base station using the directional antenna of the directional wireless hotspot device and an external wireless modem, such as a USB wireless modem.

8. The directional wireless hotspot device according to any of the preceding items, further comprising a SIM card holder.

9. The directional wireless hotspot device according to any of the preceding items, further comprising an eSIM or soft SIM.

10. The directional wireless hotspot device according to any of the preceding items, wherein the maximum height of the PCB subsystem is less than 20 mm, preferably less than 15 mm, more preferably less than 10 mm, even more preferably less than 7 mm.

11. The directional wireless hotspot device according to any of the preceding items, the device being configured to operate in frequencies in the range of 500 MHz to 60 GHz, or in the range of 700-2600 MHz 12. The directional wireless hotspot device according to any of the preceding items, wherein the mobile network is a mobile phone network and/or terminal network and/or an LTE based mobile network, and or a 3G based mobile network, and/or a 5G based mobile network.

13. The directional wireless hotspot device according to any of the preceding items, wherein the directional antenna is a planar antenna.

14. The directional wireless hotspot device according to any of the preceding items, wherein the directional antenna is a Vivaldi antenna, preferably made of dielectric plate metalized on both sides.

15. The directional wireless hotspot device according to any of the preceding items, wherein the directional antenna is a parabolic antenna.

16. The directional wireless hotspot device according to any of the preceding items, further comprising at least one secondary directional antenna.

17. The directional wireless hotspot device according to item 16, wherein the directional antenna and the at least one secondary directional antenna are configured to receive and/or transmit multiple data signals by exploiting multipath propagation in the antennas.

18. The directional wireless hotspot device according to any of items 16-17, wherein the directional antenna and the at least one secondary directional antenna are planar antennas, such as Vivaldi antennas.

19. The directional wireless hotspot device according to any of items 16-18, wherein the planar antennas are mounted on the printed circuit board, preferably arranged side by side on the printed circuit board.

20. The directional wireless hotspot device according to any of items 16-19, further comprising supplementary omni-directional antennas for each of the directional antenna and the at least one secondary directional antenna.

21. The directional wireless hotspot device according to any of items 16-20, comprising Wi-Fi circuits for each of the directional antenna and the at least one secondary directional antenna.

22. The directional wireless hotspot device according to item 14, wherein the Vivaldi antenna is made of a metal sheet, such as a copper sheet.

23. The directional wireless hotspot device according to any of the preceding items, wherein the directional antenna has a maximum height of less than 2 mm, or less than 1 mm.

24. The directional wireless hotspot device according to any of the preceding items, wherein the directional antenna has length of 5-30 cm, or 10-30 cm, or 10-20 cm.

25. The directional wireless hotspot device according to any of the preceding items, wherein the directional antenna is mounted on a first side, such as an upper side or a front side, of the printed circuit board.

26. The directional wireless hotspot device according to any of the preceding items, wherein the directional antenna and the printed circuit board constitute one integrated element.

27. The directional wireless hotspot device according to any of the preceding items, wherein the directional antenna comprises a feeding line, preferably in the shape of a hollow tube, optionally extending through a hole in the printed circuit board.

28. The directional wireless hotspot device according to any of the preceding items, wherein the Vivaldi antenna comprises one metal sheet having a tapered slot.

29. The directional wireless hotspot device according to any of the preceding items, wherein the Vivaldi antenna comprises one upper and one lower part of one metal sheet defining a tapered slot in between, wherein the upper and lower parts have sub-slots substantially perpendicular to the tapered slot.

30. The directional wireless hotspot device according to any of items 28-29, wherein the Vivaldi antenna and printed circuit board have coinciding holes in the centre of the printed circuit board and antenna, and wherein a rod rigidly connects the second motor part and the housing, the rod extending through the holes.

31. The directional wireless hotspot device according to any of the preceding items, wherein the printed circuit board is circular and the antenna covers at least 50% of the printed circuit board area, or at least 60% of the printed circuit board area, or at least 70% of the printed circuit board area.

32. The directional wireless hotspot device according to any of the preceding items, further comprising a battery and/or a power supply.

33. The directional wireless hotspot device according to item 32, wherein the battery is mounted on the printed circuit board and/or wherein the battery is part of the PCB subsystem, preferably wherein the PCB subsystem comprises an assembling element configured to hold the parts of the PCB subsystem.

34. The directional wireless hotspot device according to item 32, wherein the battery and/or power supply is mounted on the housing, the device further comprising a first slip ring for transmission of power from the battery to the printed circuit board.

35. The directional wireless hotspot device according to any of the preceding items, further comprising at least one additional slip ring(s) for transmission of electric signals to/from the rotatable printed circuit board.

36. The directional wireless hotspot device according to any of the preceding items, wherein the device is arranged such that rotation of the antenna more than a predefined angle, such as 360° or 540° or 720°, is prevented.

37. The directional wireless hotspot device according to item 36, wherein the antenna is rotated 360°, or a value corresponding to the predefined angle, backwards when the predefined angle is reached.

38. The directional wireless hotspot device according to any of items 36-37, wherein a position in relation to the predefined angle is controlled by the microcontroller.

39. The directional wireless hotspot device according to any of items 36-38, wherein transmission of electric signals and/or power to/from the rotatable printed circuit board is provided by a flexible arrangement of the cables, preferably such that the cables can withstand a rotation corresponding to the predefined angle.

40. The directional wireless hotspot device according to any of the preceding items, wherein the local communication element is a wireless communication element.

41. The directional wireless hotspot device according to any of the preceding items, further comprising a first wireless component mounted on the printed circuit board, or rigidly connected to the printed circuit board, and a second wireless component mounted on the housing or the fixed element, wherein the two wireless components communicate wirelessly.

42. The directional wireless hotspot device according to any of the preceding items, further comprising a network port, such as an Ethernet port.

43. The directional wireless hotspot device according to item 42, wherein the network port is adapted to transfer both data and electric power to the wireless hotspot device.

44. The directional wireless hotspot device according to any of the preceding items, further comprising a solar cell connected to the network port.

45. The directional wireless hotspot device according to any of the preceding items, wherein the first part of the electric motor is a frame mounted on the printed circuit board.

46. The directional wireless hotspot device according to item 45, wherein the frame has a length of 10-50 mm, or 30-50 mm and a width of 10-50 mm, or 30-50 mm.

47. The directional wireless hotspot device according to any of items 45-46, wherein the second part of the electric motor is a ring inside the frame, the ring being rotatable in relation to the frame.

48. The directional wireless hotspot device according to any of the preceding items, wherein the second part is rigidly connected to a plate substantially parallel to the printed circuit board, the plate fixed to the housing.

49. The directional wireless hotspot device according to any of the preceding items, wherein the electric motor is controlled by a processing unit.

50. The directional wireless hotspot device according to item 49, wherein the processing unit is the microprocessor.

51. The directional wireless hotspot device according to any of the preceding items, wherein the electric motor is mounted on a second side of the printed circuit board, such as a lower side or a backside.

52. The directional wireless hotspot device according to any of the preceding items, wherein the compass is arranged to provide a reference azimuth corresponding to the direction of the directional antenna in a horizontal plane.

53. The directional wireless hotspot device according to any of the preceding items, further comprising a secondary compass, optionally a tertiary compass.

54. The directional wireless hotspot device according to any of the preceding items, wherein the geographical positioning device is arranged to provide a local position of the directional antenna.

55. The directional wireless hotspot device according to any of the preceding items, wherein the microprocessor is configured to control the electric motor to rotate the directional antenna such that it points to one of the fixed transceivers.

56. The directional wireless hotspot device according to item 55, wherein the fixed transceiver corresponds to the fixed transceiver associated with a cell which the device camps on.

57. The directional wireless hotspot device according to any of items 55-56, wherein the fixed transceiver which the directional antenna is configured to point to is dynamically updated based on information from the cell which the device camps on.

58. The directional wireless hotspot device according to any of the preceding items, further comprising a navigation reference unit.

59. The directional wireless hotspot device according to item 58, further comprising a gyro for assisting the compass in compensating and/or handling sudden change of direction of the antenna.

60. The directional wireless hotspot device according to any of items 58-59, further comprising an accelerometer for measuring role and/or pitch of the device, and/or compensating for the device not being in a horizontal position.

61. The directional wireless hotspot device according to any of items 58-60, the navigation reference unit configured to Kalman filter data from the compass, the geographical positioning device, the gyro and the accelerometer to obtain a more accurate direction of the directional antenna.

62. The directional wireless hotspot device according to any of the preceding items, further comprising a gimbal for maintaining the device in a horizontal position.

63. The directional wireless hotspot device according to any of the preceding items, further comprising connectors for connecting the local communication element to an external antenna, such as a Wi-Fi antenna.

64. The directional wireless hotspot device according to any of the preceding items, wherein the housing has a maximum height of 15 cm, or a maximum height of 12 cm, or a maximum height of 10 cm, or a maximum height of 5 cm.

65. The directional wireless hotspot device according to any of the preceding items, wherein the housing has a substantially circular horizontal cross-section, such as a cylindrical shape or a tapered cylindrical shape.

66. The directional wireless hotspot device according to any of the preceding items, wherein the housing has a tapered groove along the bottom side of the housing, the tapered groove having a shape extending upwards, the tapered groove configured to attach the device to a mounting on a wall, ceiling or rod.

67. The directional wireless hotspot device according to any of the preceding items, wherein the antenna is mounted on the front side of the printed circuit board and the compass, the geographical positioning device, the electric motor, the wireless modem, the local communication element and the microprocessor are mounted on the backside of the printed circuit board.

68. A method for automatically pointing a directional antenna of a wireless communication device to a fixed transceiver in a mobile network having a plurality of distributed cells, each cell covered by at least one fixed transceiver, the method comprising the steps of:
- a) identifying a cell ID of a cell associated with the wireless communication device, preferably a cell which the wireless communication device camps on;
- b) obtaining or extracting positional data for the fixed transceiver associated with the cell ID;
- c) obtaining a reference azimuth corresponding to the direction of the directional antenna in a horizontal plane;
- d) obtaining a local position of the directional antenna;
- e) based on the positional data for the fixed transceiver and the local position of the directional antenna, calculating a pointing azimuth between the directional antenna and the fixed transceiver;
- f) calculating an azimuthal rotation angle between the reference azimuth and the pointing azimuth;
- g) rotating the directional antenna towards the fixed transceiver based on the calculated azimuthal rotation angle;
- h) continuously, or at intervals, repeating steps a-g.

69. The method for automatically pointing a directional antenna of a wireless communication device to a fixed transceiver according to item 68, wherein the wireless communication device is updated to camp on a new cell of the mobile network in a reselection process, and wherein the cell ID, positional data of the corresponding fixed transceiver, pointing azimuth and azimuthal rotation angle are updated based on the new cell and the directional antenna rotated towards the fixed transceiver of the new cell.

70. The method for automatically pointing a directional antenna of a wireless communication device to a fixed transceiver according to item 68, wherein the reselection process is based on information about the positions of the fixed transceivers and the local position of the directional antenna.

71. An initialization sequence for automatically pointing a directional antenna of a wireless communication device to a fixed transceiver in a mobile network having a plurality of distributed cells, each cell covered by at least one fixed transceiver, the method comprising the steps of:
- a) identifying a cell ID of a cell associated with the wireless communication device, preferably a cell which the wireless communication device camps on,
- b) obtaining or extracting positional data for the fixed transceiver associated with the cell ID;
- c) obtaining a reference azimuth corresponding to the direction of the directional antenna in a horizontal plane;
- d) obtaining a local position of the directional antenna;
- e) based on the positional data for the fixed transceiver and the local position of the directional antenna, calculating a pointing azimuth between the directional antenna and the fixed transceiver;
- f) calculating an azimuthal rotation angle between the reference azimuth and the pointing azimuth;
- g) rotating the directional antenna towards the fixed transceiver based on the calculated azimuthal rotation angle;

72. The directional wireless hotspot device according to any of items 1-67, configured to perform the methods according to any of items 68-71.

The invention claimed is:

1. A directional wireless hotspot device for communication in a mobile cellular communications network having a number of distributed cells, each cell having a cell ID associated with a fixed transceiver, the device comprising:
- a printed circuit board;
- a directional antenna mounted on the printed circuit board;
- a compass;
- a geographical positioning device;
- an electric motor for rotating the printed circuit board around an axis substantially perpendicular to the directional antenna to point the directional antenna;
- a wireless modem or a receiving element arranged to receive an external wireless modem;
- a local communication element for communication with a local device;
- a microprocessor configured to calculate an azimuthal rotation angle and control the electric motor to point the directional antenna to one of the fixed transceivers based on:
  - directional and positional data from the compass and geographical positioning device;
  - positional data of the fixed transceivers;
- wherein upon a reselection process, the microprocessor is configured to obtain or extract positional data for the fixed transceiver associated with a new one of the number of distributed cells, and wherein the microprocessor is updated to point the directional antenna to the fixed transceiver associated with the new cell, wherein the directional wireless hotspot device is updated dynamically such that the directional antenna always points to the cell which the directional wireless hotspot device camps on;
- a housing.

2. The directional wireless hotspot device according to claim 1, wherein the compass, the electric motor and the wireless modem are mounted on the printed circuit board, and wherein the electric motor comprises a first motor part rigidly connected to the printed circuit board and a second motor part rigidly connected to the housing.

3. The directional wireless hotspot device according to claim 2, wherein the printed circuit board, the antenna, the compass, the geographical positioning device, the electric motor, the wireless modem, the local communication element and the microprocessor form a PCB subsystem, and wherein the first and second motor parts are rotatably connected such that the PCB subsystem is rotatable in relation to the housing.

4. The directional wireless hotspot device according to claim 3, further comprising a battery and/or a power supply, wherein the battery is mounted on the printed circuit board and/or wherein the battery is part of the PCB subsystem, preferably wherein the PCB subsystem comprises an assembling element configured to hold the parts of the PCB subsystem.

5. The directional wireless hotspot device according to claim 1, wherein the printed circuit board and the housing are rotatable in relation to each other.

6. The directional wireless hotspot device according to claim 1, wherein the directional antenna is a Vivaldi antenna.

7. The directional wireless hotspot device according to claim 6, wherein the Vivaldi antenna comprises one metal sheet having a tapered slot.

8. The directional wireless hotspot device according to claim 6, wherein the Vivaldi antenna and printed circuit board have coinciding holes in the centre of the printed circuit board and antenna, and wherein a rod rigidly connects the second motor part and the housing, the rod extending through the holes.

9. The directional wireless hotspot device according to claim 1, wherein the directional antenna is mounted on a first side of the printed circuit board.

10. The directional wireless hotspot device according to claim 1, wherein the device is arranged such that rotation of the antenna more than a predefined angle is prevented.

11. The directional wireless hotspot device according to claim 10, wherein the antenna is rotated 360°, or a value corresponding to the predefined angle, backwards when the predefined angle is reached.

12. The directional wireless hotspot device according to claim 1, wherein transmission of electric signals and/or power to/from the rotatable printed circuit board is provided by a flexible arrangement of cables, such that the cables can withstand a rotation corresponding to the predefined angle.

13. The directional wireless hotspot device according to claim 1, wherein the geographical positioning device is arranged to provide a local position of the directional antenna.

14. A method for automatically pointing a directional antenna of a wireless communication device to a fixed transceiver in a mobile cellular communications network having a plurality of distributed cells, each cell covered by at least one fixed transceiver, the method comprising the steps of:
   a) identifying a cell ID of a cell which the wireless communication device camps on;
   b) obtaining or extracting positional data for the fixed transceiver associated with the cell ID;
   c) obtaining a reference azimuth corresponding to the direction of the directional antenna in a horizontal plane;
   d) obtaining a local position of the directional antenna;
   e) based on the positional data for the fixed transceiver and the local position of the directional antenna, calculating a pointing azimuth between the directional antenna and the fixed transceiver;
   f) calculating an azimuthal rotation angle between the reference azimuth and the pointing azimuth;
   g) rotating the directional antenna towards the fixed transceiver based on the calculated azimuthal rotation angle;
   h) continuously, or at intervals, repeating steps a-g, upon a reselection process, further comprising the steps of obtaining or extracting positional data for the fixed transceiver associated with a new one of the plurality of distributed cells and pointing the directional antenna to the fixed transceiver associated with the new cell, thereby dynamically updating the directional wireless hotspot device such that the directional antenna always points to the cell which the directional wireless hotspot device camps on.

* * * * *